United States Patent [19]
Marui

[11] Patent Number: 6,017,176
[45] Date of Patent: Jan. 25, 2000

[54] ADHESIVE-DISPENSING FASTENER

[75] Inventor: Hideo Marui, Toyohashi, Japan

[73] Assignee: Emhart Inc., Newark, Del.

[21] Appl. No.: 09/144,692

[22] Filed: Sep. 2, 1998

[30] Foreign Application Priority Data

Sep. 5, 1997 [JP] Japan ................................. 9-240543

[51] Int. Cl.[7] .................................................. F16B 39/02
[52] U.S. Cl. ............................................ 411/82; 411/258
[58] Field of Search ............................ 411/82, 258, 930, 411/107, 171; 248/205.3

[56] References Cited

U.S. PATENT DOCUMENTS

| | | |
|---|---|---|
| 3,226,140 | 12/1965 | Voegeli ........................................ 41/82 |
| 4,425,065 | 1/1984 | Sweeney . |
| 5,044,852 | 9/1991 | Sweeney ................................. 411/82 |
| 5,277,530 | 1/1994 | Sweeney ................................ 411/258 |
| 5,584,630 | 12/1996 | Sweeney ................................ 411/258 |

*Primary Examiner*—Flemming Saether
*Attorney, Agent, or Firm*—Edward D. Murphy

[57] ABSTRACT

To provide an adhesive fastener which has no need of a vacuum cup or a tab, an adhesive fastener 1 comprises a body member 2 and a tank member 3. The tank member 3 forms an adhesive container 10 in which adhesive material is contained. One end of the tank member is open but the other end is closed by a rigid end wall 13 and a frangible thin portion 14. The body member 2 has a plunger 18 which is slidably inserted from the opening side into the adhesive container 10 and forces out the adhesive from the frangible end, and an adhesive surface 22 which is formed outside the tank member so as to move together with the plunger and comes into contact with the surface of an attachment member to be bonded to the attachment member by means of the adhesive material. On the frangible end of the tank member, a protrusion 6 protruding axially outwardly is provided in the center or axis. In the initial state that the adhesive material contained in the adhesive container 10 is sealed by the plunger 18, the adhesive surface 22 is positioned farther from the frangible end than the surface of the attachment member is. When the protrusion 6 is brought into contact with the attachment member and the body member 2 is pressed, the plunger 18 presses the adhesive material in the tank member and breaks the frangible thin portion 14 to cause the adhesive to material flow out onto the surface of the attachment member. When the body member is pressed further, the adhesive surface comes into contact with the surface of the attachment member and is fixed to the attachment member by means of the adhesive which has flowed out.

10 Claims, 11 Drawing Sheets

ADHESIVE-DISPENSING FASTENER

DESCRIPTION OF INVENTION

1. Field of Invention

The present invention relates to an adhesive fastener which has a tank for an adhesive to be contained therein and a plunger to push out the adhesive in the tank onto the surface of an attachment member when pressed onto the attachment member, so that the fastener is fixed to the attachment member by means of the adhesive pushed out.

2. Prior Art

Japanese Patent No. 2,541,649 (corresponding to U.S. Pat. No. 5,044,852) and Japanese Patent National Publication No. 60-500679 (International Publication No. WO 84/02960, corresponding to U.S. Pat. No. 4,425,065) disclose adhesive fasteners comprising a tank for an adhesive to be contained therein and a plunger to push out the adhesive in the tank onto the surface of an attachment member when pressed onto the attachment member, so that the fastener is fixed to the attachment member by means of the adhesive pushed out. These fasteners are convenient in that they can eliminate the need to make a hole in an attachment member such as a panel, and the need to fix a stud by welding or some other means, and can be fixed to the attachment member simply when pressed on to the attachment member.

Nevertheless, the above conventional adhesive fasteners still have room for improvement. For instance, the adhesive fastener of Japanese Patent No. 2,541,649 uses vacuum suction, for which a vacuum cup has to be formed in the body. Additionally, the vacuum suction is insufficient in case the attachment member surface is coarse. Since the vacuum cup has a large diameter, it interferes with proper positioning as the mounting position on the attachment member is occupied by the vacuum cup. In the adhesive fastener of Japanese Patent National Publication No. 60-500679, in order to increase the contact area with the attachment member or to strengthen the connection between attachment members, tabs to extend radially outwardly from the tank by pressing the plunger must be formed. In the case of this adhesive fastener, as the adhesive expands around the outwardly extended tabs, it may come in direct contact with a finger of the operator.

Accordingly, the present invention aims to provide an adhesive fastener which has no need of a vacuum cup or a tab.

SUMMARY OF THE INVENTION

In order to attain the above object, according to the present invention, there is provided an adhesive fastener comprising tank means for containing an adhesive and plunger means to push out the adhesive in the tank mean onto the surface of an attachment member by pressing it onto the attachment member, whereby the pushed out adhesive causes the fastener to be fixed to the attachment member; characterized in that the tank means comprises a tubular tank member hollowed to receive the adhesive and including one end which is open while the other end is closed but is frangible, and the adhesive fastener includes, as a separate member from the tank member, a body member having a plunger which is slidably inserted from the open end into the hollow portion of the tank member and pushes out the adhesive out of the frangible end, and an adhesive surface which is formed outside the tank member so as to move together with the plunger, comes into contact with the surface of the attachment member, and is bonded to the attachment member by means of the adhesive; the frangible end of the tank member being provided with a protrusion protruding axially outwardly in its axis; and wherein in the initial state that the plunger is fitted within the hollow portion of the tank member to seal up the adhesive member contained in the hollow portion, the adhesive surface is located farther from the frangible end of the tank member than the attachment member surface; when the protrusion is brought in contact with the attachment member and the body member is pressed, the plunger pushes the adhesive in the tank member to break the frangible end of the tank member to cause the adhesive to flow out onto the surface of the attachment member; and further pressing the body member allows the adhesive surface to come into contact with the surface of the attachment member to be fixed to the attachment member by means of the adhesive which has flowed out.

Without need of a vacuum cup or a tab, the above adhesive fastener allows the adhesive to be squeezed out of the tank member onto the attachment member when the body member is pressed onto the attachment member after the protrusion of the tank member is positioned to the attachment member, and the adhesive flows out onto the surface of the attachment member. Upon further pressing the body member, the adhesive surface of the body member comes into contact with the attachment member and by means of the adhesive staying there, the adhesive surface is fixed to the surface of the attachment member. Therefore, positioning can be accomplished by bringing the elongated protrusion of the tubular tank member to a predetermined point of the attachment member, and this positioning is accurate enough. The adhesive can be sealed up between the adhesive surface and the attachment member so as not to touch a finger of the operator.

In the adhesive fastener of the present invention, guide pin may be formed to extend in the axial position oppositely to the protrusion in the frangible end of the tank member, a tubular adhesive container may be formed between the outer wall of the guide pin and the inner wall of the outer tubular portion of the tank member, and in the plunger a guide hole may be formed to receive the guide pin slidably to be longer than the guide pin, whereby it is ensured that the plunger moves along the axis of the tank member by means of the guide pin and the guide hole. In this adhesive fastener, by forming the frangible end with a rigid end wall and a frangible thin portion between the rigid end wall and the guide pin, it can be constructed so that that end of the tank member is closed by the thin portion before the thin portion is broken. In this adhesive fastener, it is also possible to make the adhesive spread extensively from the tank member by increasing its flow velocity, which is achieved by selecting the size of the thin portion so as to let the adhesive flow out rapidly from its exit formed when the thin portion is broken. In order to facilitate the insertion of the plunger into the tubular adhesive container of the tank member, the leading end portion of the plunger is formed with a circumferential slit throughout its circumference to give radial resiliency, and the inner wall of the outer tubular portion of the tank member is formed with a circumferential projection to come into full circumferential contact with the outer wall of the plunger. These arrangements help the plunger moves smoothly while sealing up the adhesive within the adhesive container, resulting in smooth pushing out of the adhesive.

In the adhesive fastener of the present invention, the adhesive surface of the body member may be formed in a circular disc extending radially outwardly from the outer tubular portion of the tank member, and the adhesive surface may be formed with a plurality of radially extending ribs and circumferential ribs having different diameters, i.e. a plurality of recesses to receive surplus adhesive may be formed independently both in radial and circumferential directions to confine surplus adhesive between the adhesive surface and the attachment member, thereby preventing the operators fingers from touching the adhesive. In the adhesive fastener, the tubular supporting portion is integrally molded with the adhesive surface formed so as to surround the outer tubular portion of the tank member, the tubular supporting member is connected to the end of the plunger, and a space for receiving the outer tubular portion of the tank member slidably is formed between the supporting portion and the plunger so that both the plunger and the adhesive surface are integrated and movement of the plunger is facilitated. In this adhesive fastener, the movement of the plunger is made smooth by providing the space between the tubular supporting portion and the plunger with a vent hole allow air pressurized or depressurized by the movement of the plunger to escape from the space.

In the above-described adhesive fastener, a rod-like engagement portion formed with threads or circumferential grooves for fixing another member can be molded integrally with the upper end of the tubular supporting portion connecting the plunger and the adhesive surface together. In this adhesive fastener, another member such as a wire-harness bundling clip can be attached to the rod-like engagement portion after the adhesive surface is fixed to the attachment member. There is another example in which another member such as a wire-harness bundling clip can be attached to the rod-like engagement portion before the adhesive surface is fixed to the attachment member. In the above adhesive fastener, it is also possible that the side of the tubular supporting portion connecting the plunger and the adhesive surface together is formed with threads or circumferential grooves for fixing another member.

DESCRIPTION OF A PREFERRED EMBODIMENT

Figure 1:
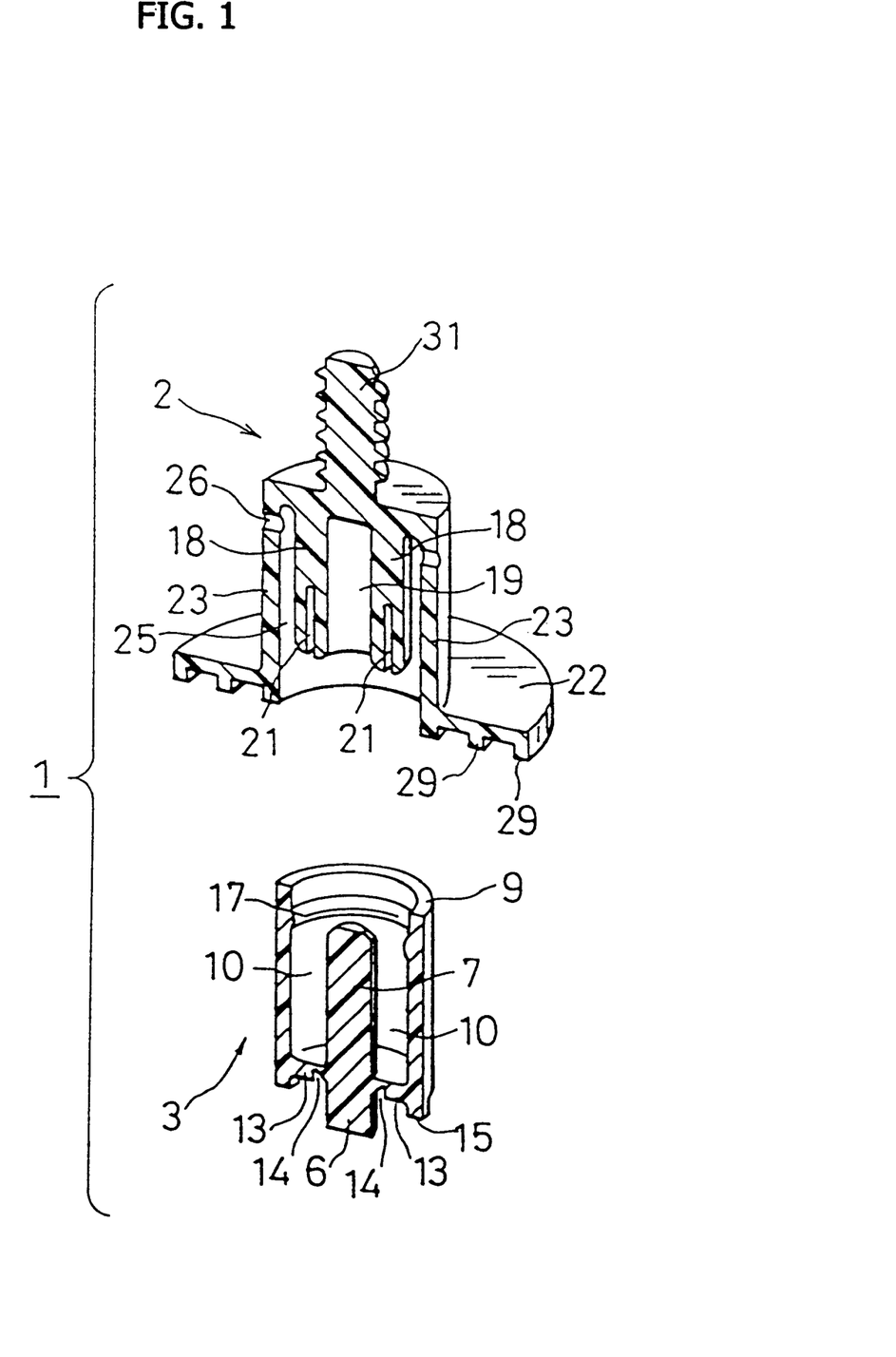
FIG. 1 is a sectional perspective view of an adhesive fastener according to the present invention before assembled.
Figure 2:
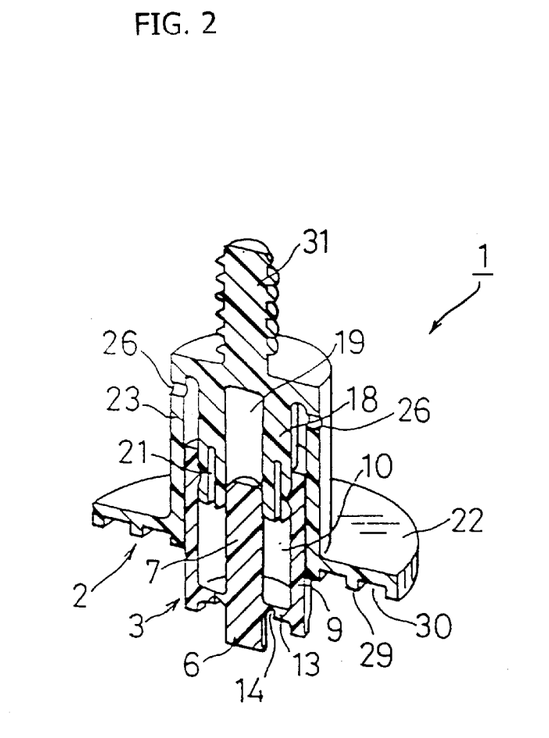
FIG. 2 is a sectional perspective view of the assembled adhesive fastener of the present invention, without adhesive contained in it for convenience in describing.
Figure 3:
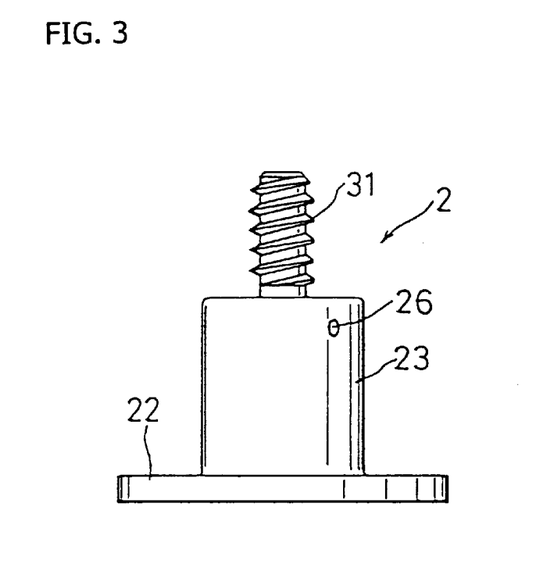
FIG. 3 is a front view of the body member of the adhesive fastener.
Figure 4:
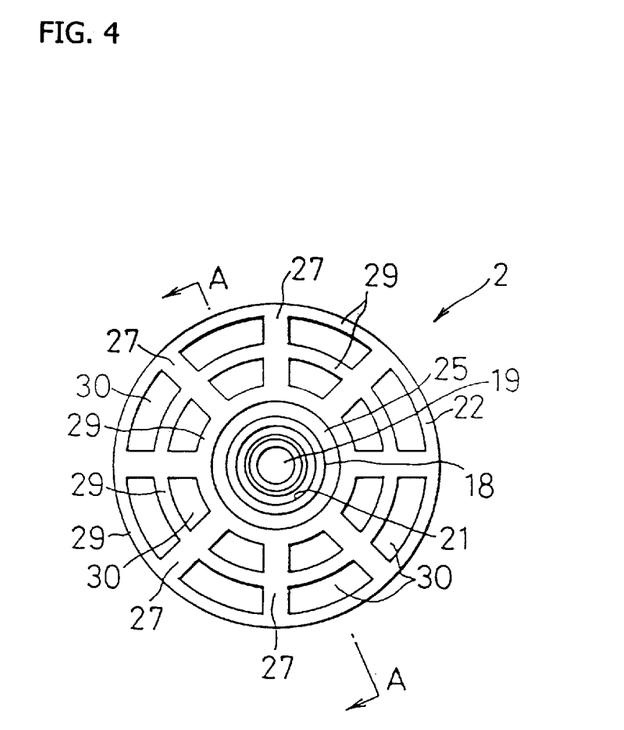
FIG. 4 is a bottom view of the body member of the adhesive fastener.
Figure 5:
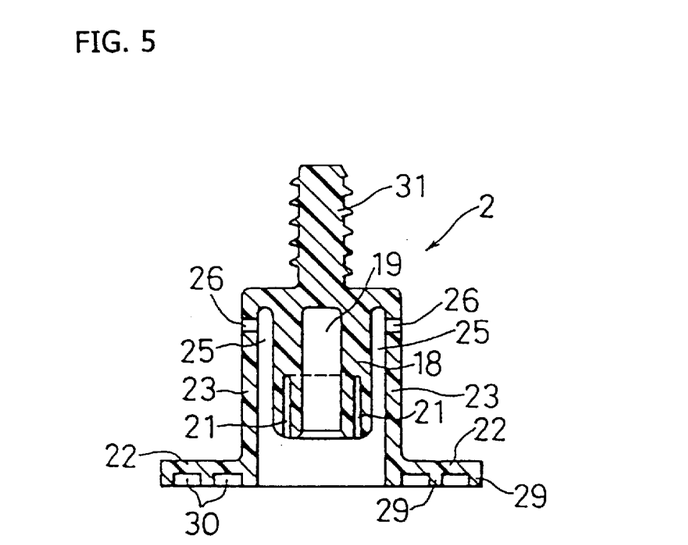
FIG. 5 is a sectional view of the adhesive fastener taken along line A—A of FIG. 4.
Figure 6:
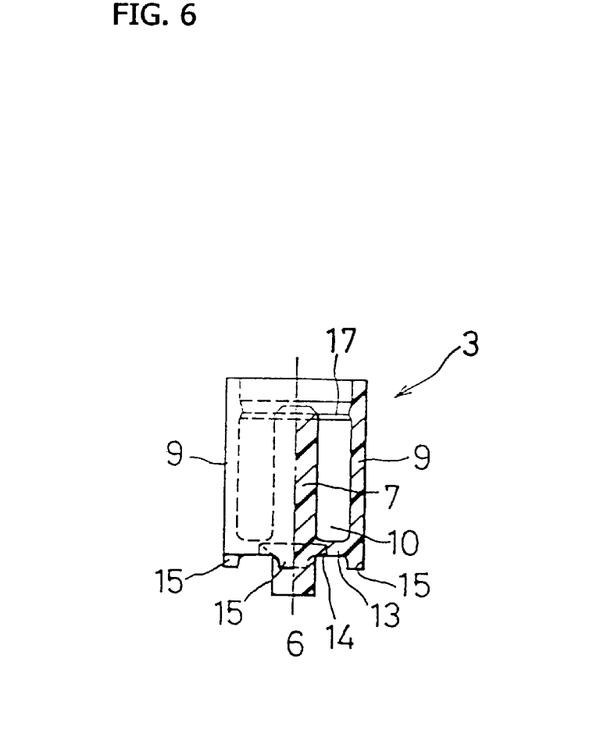
FIG. 6 is a half sectional front view of the tank member of the adhesive fastener.
Figure 7:
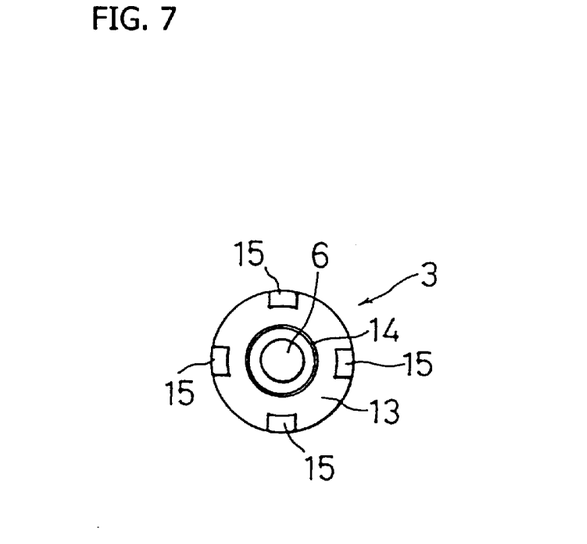
FIG. 7 is a bottom view of the tank member of the adhesive fastener.
Figure 8:
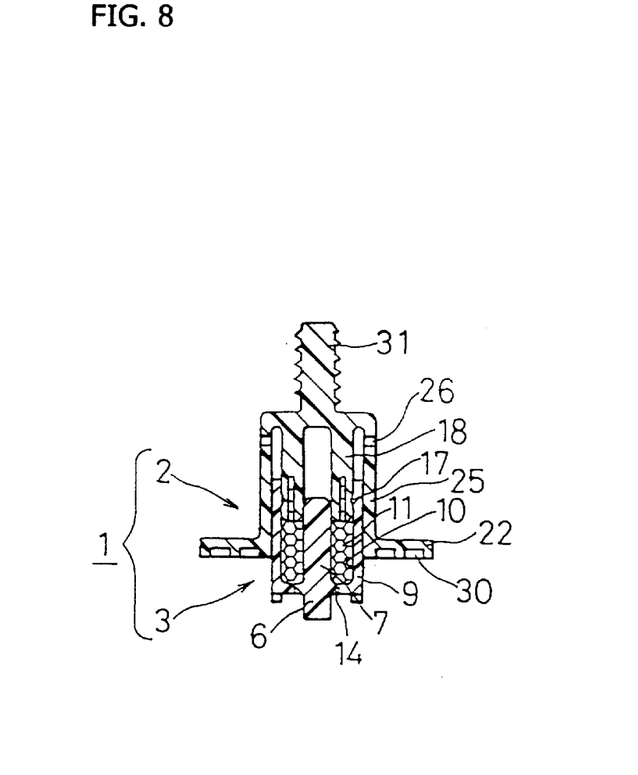
FIG. 8 is a sectional front view of the adhesive fastener of the present invention, with an adhesive contained therein.
Figure 9:
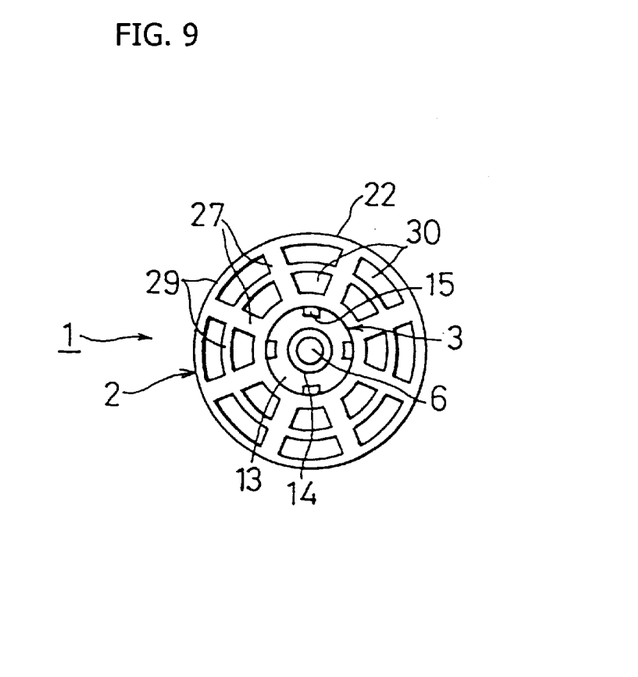
FIG. 9 is a bottom view of the adhesive fastener of FIG. 8.
Figure 10:
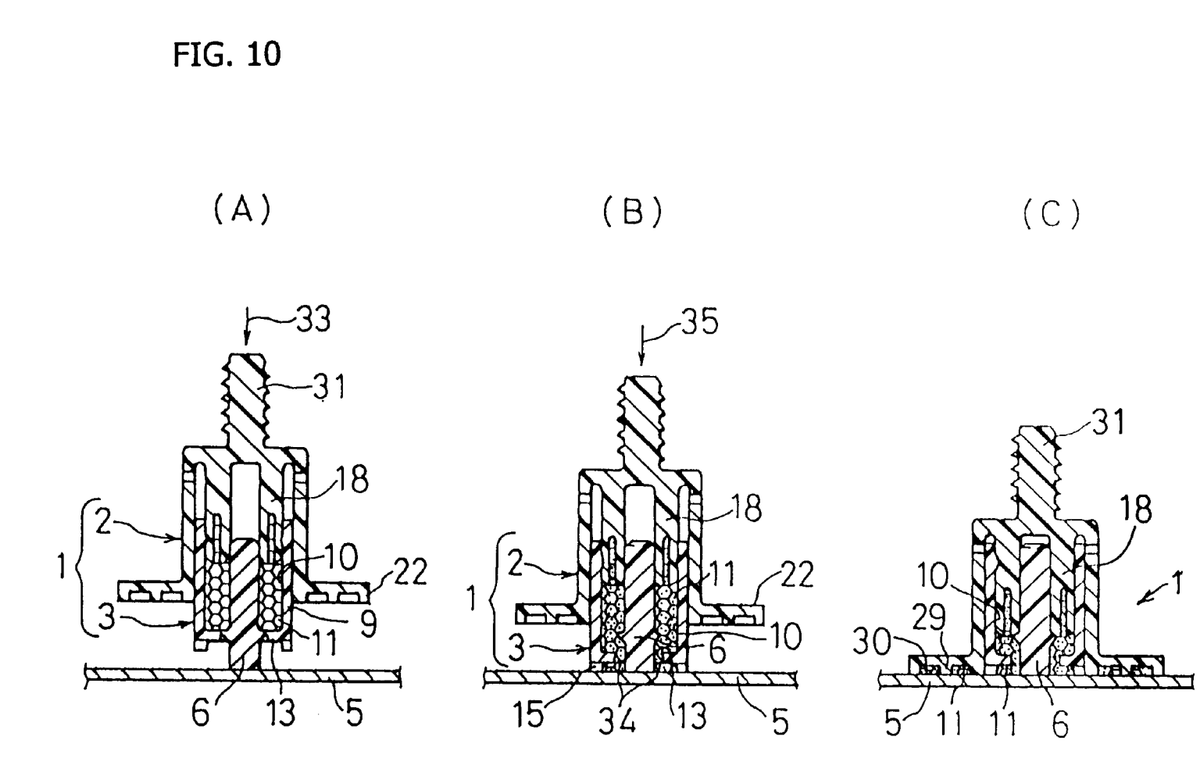
FIG. 10 illustrates and attaching operation, that is, steps of attaching the adhesive fastener to an attachment member, (A) shows the initial state in which the adhesive fastener is positioned to the attachment member, (B) shows a state in the middle of attachment, and (C) shows the completion of attachment.

The present invention is described further by way of an embodiment, referring to accompanying drawings. FIGS. 1 and 2 show a whole of an adhesive fastener 1 along an embodiment according to the present invention. FIG. 1 shows the adhesive fastener 1 before assembly, or after disassembled FIG. 2 shows the assembled adhesive fastener 1, without an adhesive for convenience sake in illustrating. In FIGS. 1 and 2, the adhesive fastener 1 comprises a body member 2 molded as a one-piece member of plastic resin material, and a tank member 3 also molded as a one-piece member of plastic resin material. The body member 2 and the tank member 3 are assembled together in use. FIGS. 3 through 5 are a side view, a bottom view of the body member 2, and a sectional view taken along the line A—A of FIG. 4, respectively. FIGS. 6 and 7 are a half sectional front view and a bottom view of the tank member. FIGS. 8 and 9 are a sectional front view and a bottom view of the assembled adhesive fastener. FIGS. 10(A) through (C) show steps of fixing the adhesive fastener 1 to an attachment member 5, which is, for example, a panel.

To begin with, the tank member 3 is described with reference to FIGS. 1 and 2 and FIGS. 6 and 7. As a whole, the tank member 3 is tubular, with an open upper end and a closed lower end, to form a hollow portion in which an adhesive is contained. On the lower end of the tank member 3, and in the center thereof, a protrusion 6 extending outwardly in the axial direction, i.e., downwardly, is provided. From the closed lower end of the tank member 3, a guide pin 7 extends oppositely to the protrusion 6, i.e., upwardly to a point adjacent to the upper end of the tank member 3. Between the guide pin 7 and the inner wall of an outer tubular portion 9 of the tank member 3, a tubular adhesive container 10 is formed and a liquid adhesive 11 is contained in the adhesive container 10 as shown in FIG. 8. As this adhesive, what are described in Japanese Patent No. 2,541,649 and Japanese Patent National Publication No. 60-500679 can be used and other quick-drying liquid adhesives are also usable.

The lower end of the tank member 3, which is closed, comprises a rigid end wall 13 and a frangible thin portion 14 between the rigid end wall 13 and the guide pin 7. When the adhesive contained in the adhesive container 10 is pushed by a plunger which is to be described later, its pressure force pushes the rigid end wall 13 downward. Since the protrusion 6 is in contact with the attachment member as it stands, the outer tubular portion 9 and the rigid end wall 13 move downward and the thin portion 14 is broken at that time. The force of this break can be selected properly in accordance with the thickness of the thin portion 14. When the thin portion 14 is broken, an exit from which the adhesive flows down is formed between the rigid end wall 13 and the outer wall of the protrusion 6. If the exit is narrow, it works like a nozzle. If the force to push the adhesive is increased, the flow velocity of the adhesive becomes higher so that the adhesive is discharged like a spray out of the nozzle-like exit. This is preferable as the uniformly spread adhesive is discharged. Another advantage is that the spreading shortens the period of time during which the adhesive hardens. On the lower end of the outer tubular portion 9, small legs 15 projecting short in the downward direction are formed at four points, and spaces for discharging the adhesive are formed between these legs 15. When the lower end of the outer tubular portion 9 is in contact with the attachment member, the spaces for discharging the adhesive are thus secured between the outer tubular portion 9 and the attachment member, and then the adhesive is discharged radially outwardly from the lower end of the tank member 3 through these spaces. In the initial state that the thin portion 14 is connected, the legs 15 are substantially shorter than the protrusion 6 and do not prevent both the outer tubular portion 9 and the rigid end wall 13 from moving downward. At a height close to the upper end of the guide pin 7, the inner wall of the outer tubular portion 9 of the tank member 3 is formed with a circumferential projection 17 throughout the entire circumference. The circumferential projection 17 comes into contact with the outer wall of the plunger, which is to be described later, throughout the entire circumference, and seals up the adhesive within the adhesive container 10.

Now, the body member 2 is described with reference to FIGS. 1 and 2 and FIGS. 3 through 5. The body member 2 has a plunger 18 to be inserted slidably from the open end, i.e., from above, into the adhesive container 10 of the tank member 3. The plunger 18 is formed to be tubular, with a section and a length suitably sized to fill the adhesive container 10. In the center or axis, a guide hole 19 which is longer than the guide pin 7 is formed for receiving the guide pin 7 of the tank member 3 slidably. The plunger 18 is formed as a hollow tube as a whole. Both the guide pin 7 of the tank member 3 and the guide hole 19 to receive the pin make it sure that the plunger 18 moves along the axis of the tank member 3. Therefore, even when the pressing force is applied to the plunger 18 slightly obliquely, the plunger 18 can move smoothly along the axis of the tank member 3. On the advancing end (lower end) side of the plunger 18, a circumferential slit 21 which gives radial resiliency is formed throughout the entire circumference in a mid position widthwise so as to facilitate the insertion of the body member 2 into the adhesive container 10. Owing to the circumferential slit 21, the outer wall in the end portion of the plunger 18 is capable of bending radially inwardly while the inner wall is capable of bending outwardly. Despite the circumferential projection 17 on the inner wall of the outer tubular portion 9 of the tank member 3, the insertion of the plunger 18 is facilitated, and after the insertion, sealing-up of the adhesive container is ensured. In the initial state, the plunger 18 seals up and keeps the adhesive in the adhesive container 10 as it is. When the adhesive fastener 1 is to be fixed to the attachment member, however, the plunger functions, by its downward move, to discharge almost all the adhesive staying in the adhesive container 10. Therefore, the shape and the length of the plunger 18 are selected so as to completely fill the adhesive container 10 when the plunger 18 is fully pressed in. It is preferred to form, outside the plunger 18, a circumferential recessed portion which receives the circumferential projection 17 on the inner wall of the outer tubular portion 9 in the initial state of the plunger and lightly engages with it with a click. From the clicking sound, one can easily know that the plunger 18 has been connected in its initial state.

The body member 2 further has a horizontal circular disc-like adhesive surface 22 which is formed outside the tank member 3 so as to move together with the plunger 18, comes in contact with the surface of the attachment member and is bonded to the attachment member by means of the adhesive, and a tubular supporting portion 23 which is molded integrally with the adhesive surface in the manner that it extends upwardly from the adhesive surface 22 so as to surround the outer tubular member 9 of the tank member 3. The upper end of the tubular supporting portion 23 formed to be circular is integrally connected to the upper end of the plunger 18 and the adhesive surface 22 moves together when the plunger 18 moves. Between the tubular supporting member 23 and the plunger 18, a tubular space 25 to receive the outer tubular portion 9 of the tank member slidably is formed. In the tubular supporting portion 23 defining the space 25 is provided with air vent holes 26 to allow the air in the space 25, pressurized or depressurized by the movement of the plunger 18, to escape. The air vent hole 26 can get rid of reactive force caused by compressing the air in the tubular space 25 by means of the outer tubular portion 9 of the tank member 3 when the plunger 18 is pressed, the hole also makes the movement of the plunger 18 smooth, and prevents separation of the adhesive surface 22 and the attachment member bonded together.

The length of the tubular supporting portion 23 which sets the height of the adhesive surface 22 is selected so that in the initial state (the adhesive is contained in the adhesive container 10 of the tank member 3 and the thin portion is unbroken), the adhesive surface 22 is in a position spaced apart upwardly from the lower end of the outer tubular portion 9 of the tank member 3, i.e., the frangible thin portion 14. Further, the length of the tubular supporting portion 23 is selected so that the adhesive surface 22 is in tight contact with the attachment member in the state in which bonding has been completed (the plunger 18 is in its lowest position and the adhesive in the adhesive container 10 has just finished to be discharged). By setting the length of the tubular supporting portion 23 as described above, when the protrusion 6 of the tank member 3 is brought into contact with the attachment member to press the body member 2, the plunger 18 pressurizes the adhesive in the adhesive container 10 and presses the rigid end wall 13 and the outer tubular portion 9 downward to break the thin portion 14. This forms the exit of the adhesive between the rigid end wall 13 and the protrusion 6. While the adhesive in the adhesive container 10 is flowing out from this exit by the continued pressing-down of the plunger 18, the legs 15 of the outer tubular portion 9 come in contact with the attachment member, and the adhesive is discharged from the spaces between the legs 15 so as to spread over the surface of the attachment member. Then, further pressing the plunger 18 brings the adhesive surface 22 into contact with the surface of the attachment member and the adhesive surface 22 is fixed to the attachment member by means of the adhesive which is there.

The adhesive surface 22 is formed in a circular disc extending radially outwardly from the outer tubular portion 9 of the tank member 3. The lower side of the adhesive surface 22, that is, the surface to be bonded to the attachment member is formed with a plurality (8 in the illustrated embodiment) of radial ribs 27 extending radially outwardly and a plurality (8 in the illustrated embodiment) of circumferential ribs 29 having different diameters. These ribs 27 and 29 form a plurality (16 in the illustrated embodiment) of surplus (or excessive) adhesive receiving recesses 30, which are independent radially as well as circumferentially, on the lower side of the adhesive surface 22. When the adhesive surface 22 is in contact with the surface of the attachment member, a large number of radial ribs 27 and circumferential ribs 29 touch the attachment member to secure a sufficient bonding area, and a large number of surplus adhesive receiving recesses 30 serve to confine surplus adhesive between the adhesive surface and the attachment member. Accordingly, it also serves to keep the operator's fingers from touching the adhesive.

Figure 14:
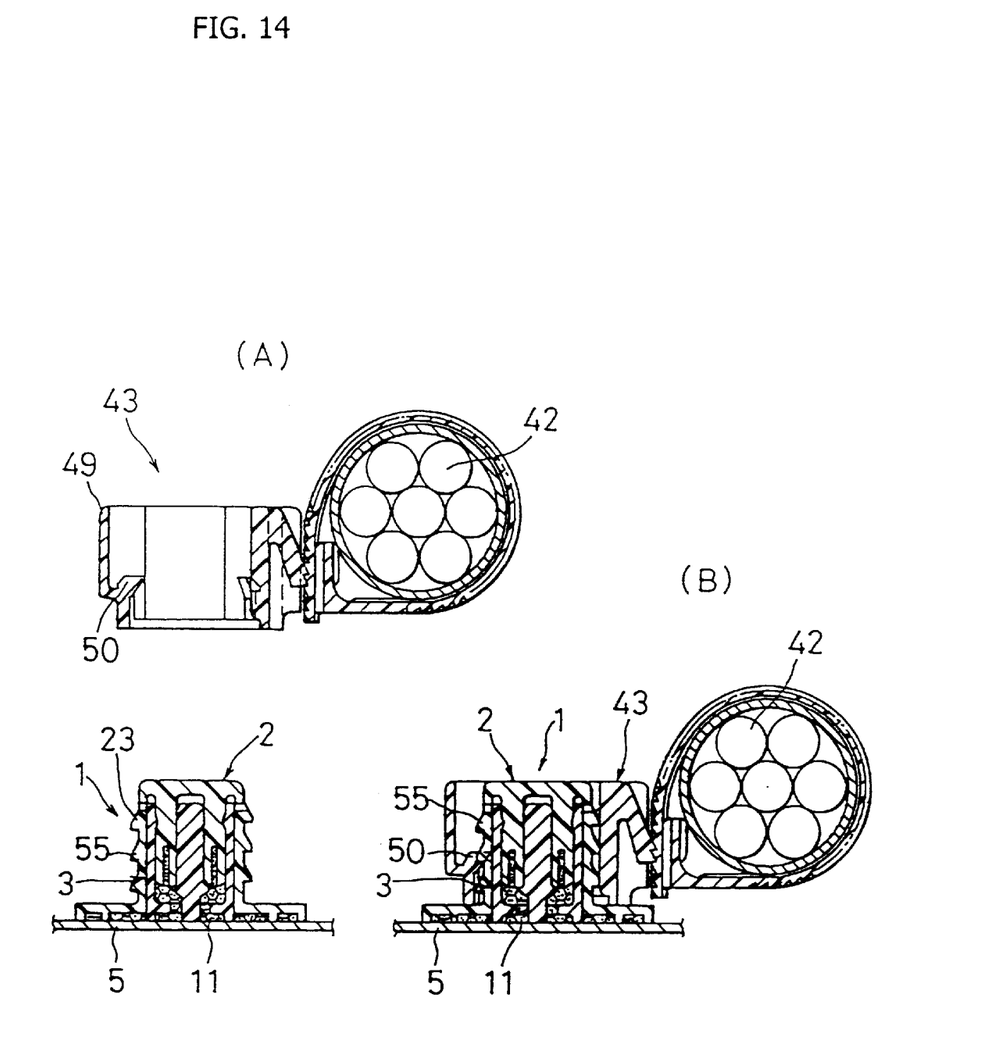
FIG. 14 illustrates steps of fixing an adhesive fastener having a different engagement portion to the attachment member and mounting the wire-harness on the attachment member, (A) shows the state before mounting and (B) shows the state after mounted.
Figure 15:
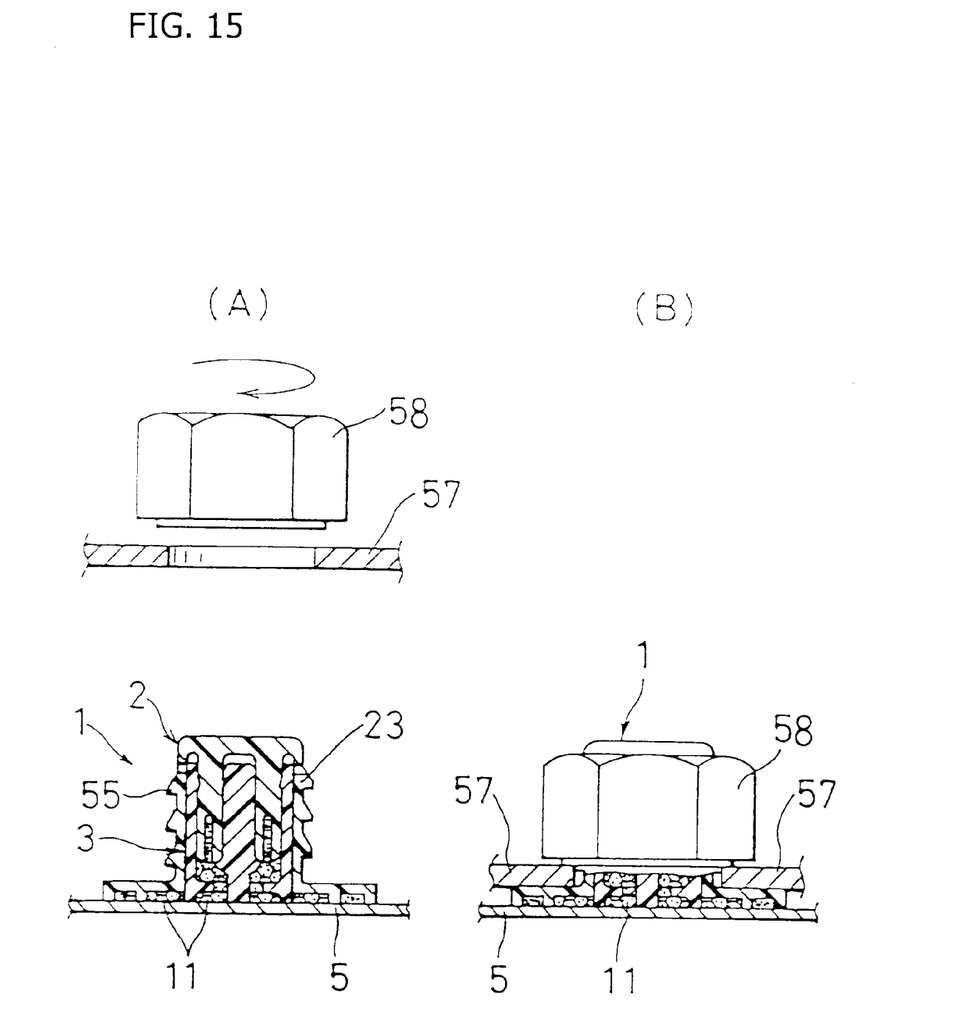
FIG. 15 illustrates steps of fixing the adhesive fastener having the engagement portion of FIG. 14 to the attachment member and mounting another member on the attachment member, (A) shows the state of the other member before mounting and (B) shows the state after mounted.

A rod-like engagement portion 31 provided with threads is formed integrally with the upper surface of the tubular supporting portion 23 so as to fix another attachment member. Although the illustrated engagement portion 31 is formed with threads on the side thereof, it may be a rod-like engagement portion formed with cirumferential grooves on the sides thereof. As shown in FIGS. 14 and 15, the tubular supporting portion 23 can be used as an engagement portion by forming threads or circimferential grooves directly on its side. Any other type of an engagement portion may be formed.

Operation of bonding and fixing the adhesive fastener 1 of the above-described structure to the attachment member 5 is explained with reference to FIGS. 8 and 9 and FIGS. 10 (A) through (C). In FIG. 8, the adhesive 11 is put in the adhesive container 10 of the tank member 3, and then the plunger 18 is inserted from the open end side into the adhesive container 10 and pressed into a position in which the advancing end of the plunger touches the adhesive 11. This position can be detected, for example, from a click sound when the circumferential projection 17 on the inner wall of the outer tubular portion 9 of the tank member 3 fits in the circumferential recessed portion (not illustrated) formed on the plunger 18. The initial state that the adhesive is contained in the adhesive container 10 and the thin portion 14 is connected as shown in FIGS. 8 and 9 is the fully assembled state of the adhesive fastener 1. In this state, the adhesive fastener can be used at any arbitrary place.

In FIGS. 10(A)–(C), the adhesive fastener 1 is fixed to the attachment member 5. In FIG. 10(A), the protrusion 6 of the tank member 3 of the adhesive fastener 1 is positioned to a predetermined point on the attachment member 5. The positioning is precise and reliable since the elongated protrusion 6 on the end is placed on a designated position of the attachment member 5. Upon positioning, pressing force is applied on the upper surface of the engagement portion 31 of the body member as indicated by an arrow 33. With the pressing force, the plunger 18 is pushed down to pressurized the adhesive 11 in the adhesive container 10. The pressurized adhesive 11 serves to push the rigid end wall 13 and the outer tubular portion 9 of the tank member 3 downwardly. By this force to press down, the thin portion 14 on the lower end of the adhesive container 10 is broken as shown in FIG. 10 (B), and an exit 34 of the adhesive 11 is formed between the rigid end wall 13 and the protrusion 6.

When the plunger 18 is pressed down continuously as indicated by an arrow 35 in FIG. 10(B), the adhesive 11 in the adhesive container 10 flows out from the exit 34, i.e., from the lower end of the adhesive container 10 onto the attachment member 5 side. The legs 15 of the outer tubular portion 9 come in contact with the attachment member 5 to maintain spaces between the legs 15 for discharging the adhesive. By continuing to apply the pressing force as indicated by the arrow 35, the adhesive is discharged from the spaces between the legs 15 so as to spread over the surface of the attachment member. It is preferable that these spaces are made thin to form a nozzle or orifice for uniform spread of the adhesive. By continuing to press down the plunger 18 after the discharge (spread) of the adhesive onto surface of the attachment member, as shown in FIG. 10 (C), the ribs 27 and 29 on the adhesive surface 22 come into contact with the surface of the attachment member 5 and then the ribs 27 and 29 are fixed to the attachment member 5 by means of the adhesive staying there. The surplus adhesive 11 is confined between the adhesive surface and the attachment member owing to a number of adhesive receiving recesses 30 to prevent the operator's fingers from touching the adhesive. As described above, the adhesive fastener 1 is permanently fixed to a predetermined position on the attachment member simply by the use of pressing force onto the body member 2.

Figure 11:
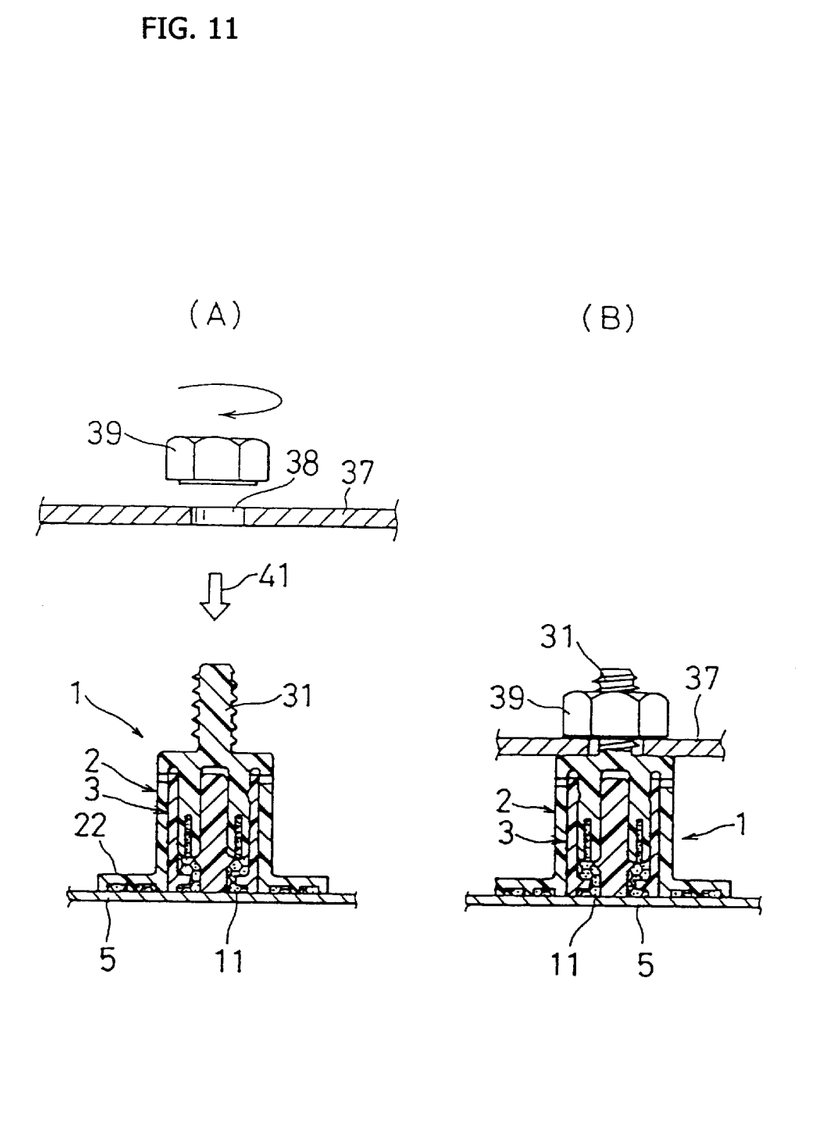
FIG. 11 illustrates steps of mounting another member by using the adhesive fastener fixed to the attachment member, (A) shows the state before mounting and (B) shows the state after mounted.

FIGS. 11 (A) and (B) shows how another member 37 is attached by using the adhesive fastener 1 fixed to the attachment member 5. As indicated by an arrow 41 in (A), a mounting hole 38 of the other member 37 is positioned so as to be penetrated by the engagement portion 31. Then, as shown in FIG. 11 (B), a nut 39 is screwed to the engagement portion 31 to fix the other member 37 to the engagement portion 31, thereby fixing the other member 37 to the attachment member 5.

Figure 12:
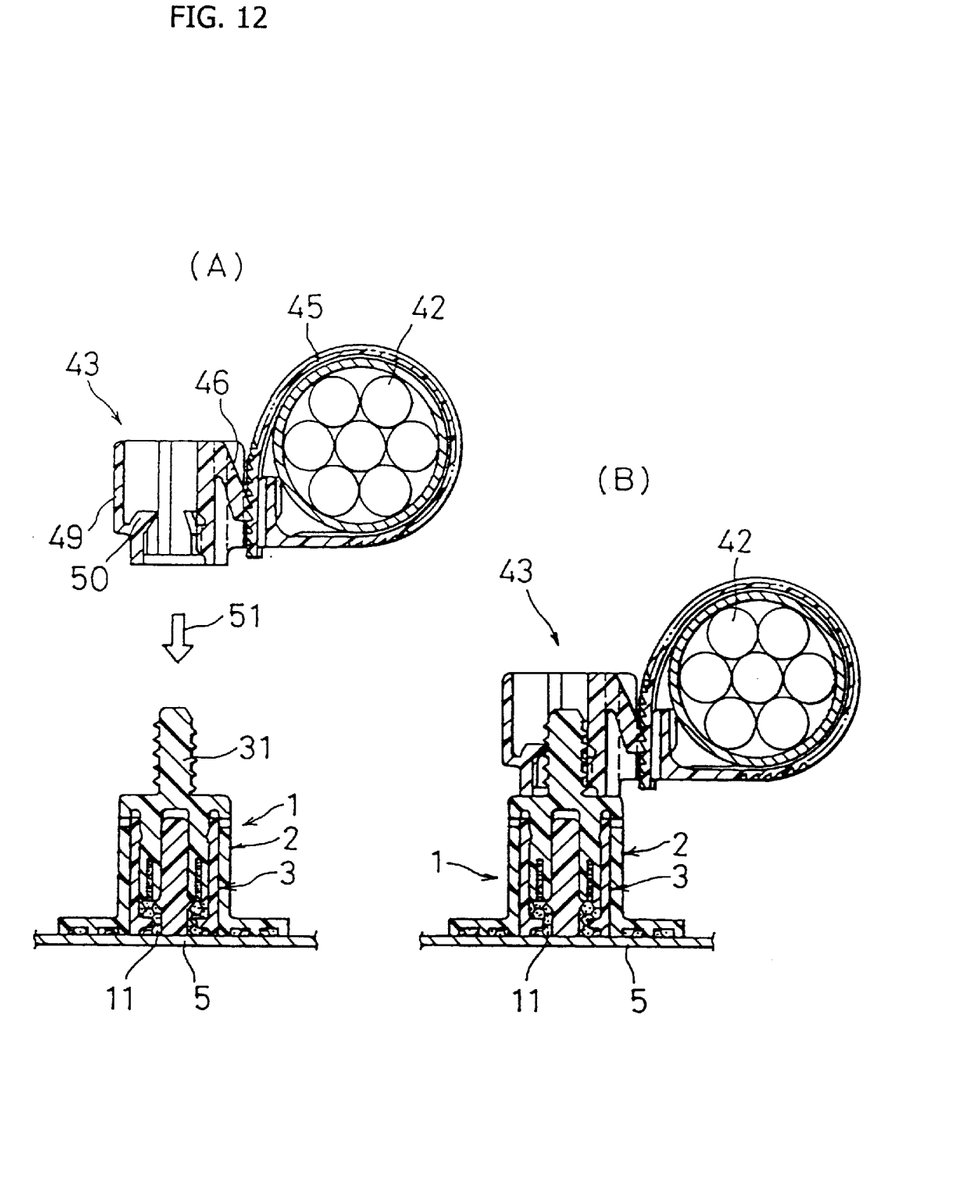
FIG. 12 illustrates steps of mounting a wire-harness by using the adhesive fastener fixed to the attachment member, (A) shows the state before mounting and (B) shows the state after mounted.
Figure 13:
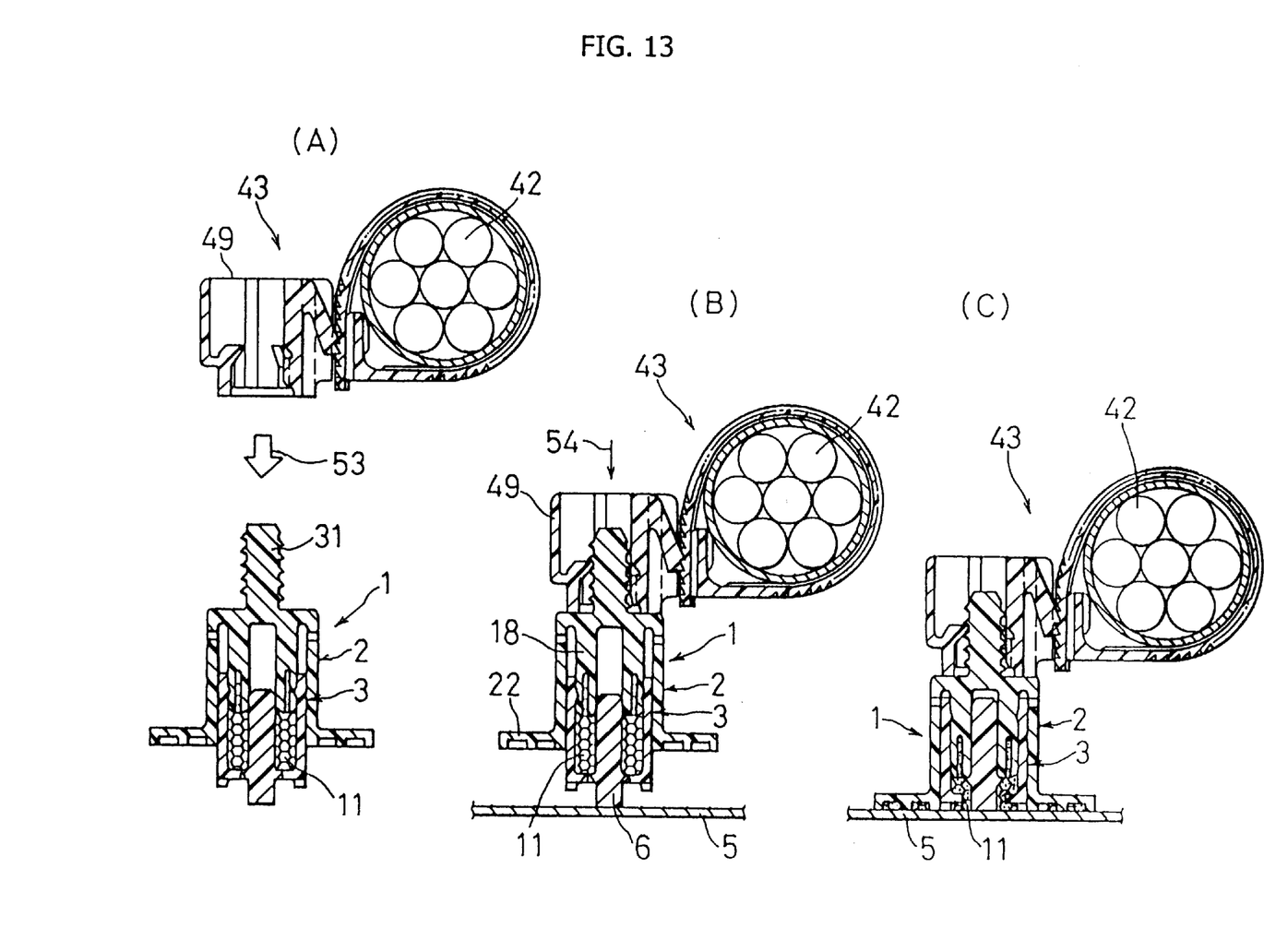
FIG. 13 illustrated steps of wire-harness mounting which are different from the ones shown in FIG. 12, (A) shows how a wire-harness bundling clip is attached to the adhesive fastener in advance, (B) shows how the adhesive fastener attached with the bundling clip is attached to the attachment member, and (C) shows the state after attachment.

FIGS. 12 (A) and (B) show how a wire-harness 42 is attached to the attachment member 5 by using the adhesive fastener 1 fixed to the attachment member 5. The wire-harness 42 is held by a wire-harness bundling clip 43. The bundling clip 43 has a band 45 for holding the wire-harness 42 and a buckle 46 to lock the band 45 in the state of bundling. Further, it has an engagement portion 49 for the engagement of the bundling clip 43 with the engagement portion 31 of the adhesive fastener 1. The engagement portion 49 is provided with engagement pawls 50. The bundling clip 43 is fixed to the adhesive fastener 1 as shown FIG. 12 (B) when the engagement portion 49 of the bundling clip 43 is pressed onto the engagement portion 31 of the adhesive fastener 1 as indicated by an arrow 51 in (A), and the wire-harness 42 is attached to the attachment member 5 as a consequence. FIGS. 13 (A) through (C) show an example which is different from the one shown in FIG. 12. In this case, the wire-harness bundling clip 43 is attached to the adhesive fastener 1 first, and then the adhesive fastener 1 holding the bundling clip 43 is mounted. As indicated by an arrow 53 in FIG. 13 (A), the engagement portion 49 of the bundling clip 43 which holds the wire-harness 42 is brought into engagement with the engagement portion 31 of the adhesive fastener 1 that is still unfixed. Next, the protrusion 6 is positioned to a predetermined point on the attachment member 5 and the engagement portion 49 of the wire-harness 43 is pressed down as indicated by an arrow 54. This fixed the adhesive fastener 1 to the attachment member 5. Since the bundling clip 43 has been attached to the adhesive fastener 1, the wire-harness 42 is mounted on the attachment member 5.

The example of FIG. 13 is suitable typically for a wire-harness manufacturer or the like to deliver wire-harnesses attached with adhesive fasteners to a fitting-out line for automobiles.

FIGS. 14 (A) and (B) show an example in which threads 55 are formed on the side of the tubular supporting portion 23 and this portion is used as an engagement portion. The threads 55 may be replaced by circumferential grooves. In the illustrated example, the wire-harness 42 is held by the bundling clip 43, of which the engagement portion 49 is formed to be large correspondingly to the outer diameter of the threads 55. After fixing the adhesive fastener 1 to the attachment member 5, the engagement portion 49 of the wire-harness bundling clip 43 is pressed down so as to receive the tubular supporting portion 23, and the engagement pawls 50 engage with threads 55. This fixes the bundling clip 43 to the adhesive fastener 1 and the wire-harness 42 is mounted on the attachment member 5. The bundling clip 43 in this example, in the same way as the example of FIG. 13, may be also brought into engagement with the adhesive fastener 1 before the latter is fixed. In the example shown in FIGS. 15 (A) and (B), like the one in FIG. 14, the threads 55 are formed on the sides of the tubular supporting portion 23 for use as an engagement portion, and another member 57 is attached by using this portion. In the case shown in FIG. 15, a mounting hole of the other member 57 is positioned to the tubular supporting portion 23 formed with the threads 55 so as to be penetrated by the supporting portion as illustrated in (A). Then, a nut 58 is screwed to the threads 55 as shown in (B) to fix the other member 57 to the adhesive fastener 1, thereby fixing the other member 57 to the attachment member 5.

Advantageous Effect of the Invention

According to the present invention, the adhesive fastener does not require a vacuum cup or a tab. When the body member is pressed onto the attachment member after positioning the protrusion of the tank member to the attachment member, the adhesive is squeezed out from the tank member to the attachment member and flows out onto the surface of the attachment member. Further pressing the body member brings the adhesive surface of the body member into contact with the surface of the attachment member and the adhesive surface is fixed to the surface of the attachment member by means of the adhesive staying there. Accordingly, positioning is accomplished by setting the elongated protrusion of the tubular tank member to a predetermined point on the attachment member; the position thus set is accurate. The adhesive is confirmed between the adhesive surface and the attachment member to prevent the operator's finger from touching the adhesive.

What is claimed is:

1. A self-contained adhesive-dispensing fastener comprising a tank member and a plunger member, said fastener being adapted for attachment to an attachment member upon movement of said plunger member into said tank member, said tank member comprising a tubular tank containing a liquid adhesive;

said tank having first and second ends, said second end being closed by a frangible closure member;

said tank member further comprising a central protrusion extending axially away from said tank from said second end, said protrusion having an end surface adapted to be engaged with the attachment member;

said plunger member comprising a plunger disposed in said first end of said tank;

an annular adhesive surface member surrounding said tank member, said adhesive surface member including at least one rib extending in the same direction as said protrusion;

the axial distance between said end surface on said protrusion and the closest portion of said rib being substantially equal to the depth of said tank below said plunger;

whereby when said fastener is applied to an attachment member and said plunger is depressed, said adhesive will be dispensed through said frangible member and said adhesive surface member will be attached to said attachment member by said adhesive.

2. A fastener as claimed in claim 1 wherein said tank member further comprises a guide pin extending into said tank from said second end along the axis of said tank, and wherein said plunger includes an aperture for receiving said guide pin to maintain axial alignment of said plunger with said tank when said plunger is depressed.

3. A fastener as claimed in claim 2 wherein said second end of said tank comprises a rigid end wall portion, said frangible closure member extending between said wall portion and said guide pin.

4. A fastener as claimed in claim 3 wherein said frangible closure member is sized to control the velocity of adhesive flow upon breakage of said member.

5. A fastener as claimed in claim 3 wherein the leading end of said plunger in said tank comprises a flexible portion to facilitate entry of said plunger into said tank, and wherein said tank includes an internal circumferential sealing projection engaged with said plunger to retain adhesive in said tank.

6. The adhesive fastener according to claim 1 wherein said adhesive surface member is provided with a plurality of radial ribs extending radially and a plurality of circumferential ribs having different diameters to form surplus adhesive receiving recesses which are independent from each other radially as well as circumferentially.

7. The adhesive fastener according to claim 1 wherein said adhesive surface member includes a tubular supporting portion surrounding said tubular tank, said tubular tank supporting portion being connected to said plunger to form a space for receiving said tubular tank.

8. The adhesive fastener according to claim 7 wherein said tubular supporting portion is provided with a vent hole for venting said space upon movement of said plunger.

9. The adhesive fastener according to claim 7 wherein a rod-like engagement portion is provided extending from said tubular supporting portion, said engagement portion having indentations on its surface adapted to retain a further member.

10. The adhesive fastener according to claim 7 wherein the radially outward surface of said tubular supporting portion is provided with indentations adapted to retain a further member.

* * * * *